April 6, 1948.  J. O. ANTONSON  2,439,033
VANED TIRE
Filed March 1, 1947

Inventor
John O. Antonson
By
Atty

Patented Apr. 6, 1948

2,439,033

UNITED STATES PATENT OFFICE 2,439,033

VANED TIRE

John O. Antonson, Akron, Ohio, assignor to The B. F. Goodrich Company, New York, N. Y., a corporation of New York Application March 1, 1947, Serial No. 731,789

7 Claims. (Cl. 244—103)

This invention relates to vaned tires and is especially useful in providing prerotation of the wheels of aircraft and thereby avoiding excessive wear of the tires in landing and reducing the shock of the landing.

Heretofore, while good results have been obtained with vaned tires in reducing wear of the tires and shock incident to landing of aircraft, in some cases vanes have been torn from the tires by the force of the air stream due to weakening of the vanes at the hinge portion, especially after many flexures. Premature loss of the vanes has in some cases been aggravated by weakening of the rubber material at the hinge due to the presence of oil and grease on the tire.

Objects of the invention are to provide against separation of the vanes from the tire, to provide reinforcement of the vanes at the hinge line without objectionable reduction of stretchability of the material at the hinge, to eliminate sharp corners at the hinge line, and to provide resistance to oil and grease.

These and other objects will appear from the following description and the accompanying drawings.

Figure 1:
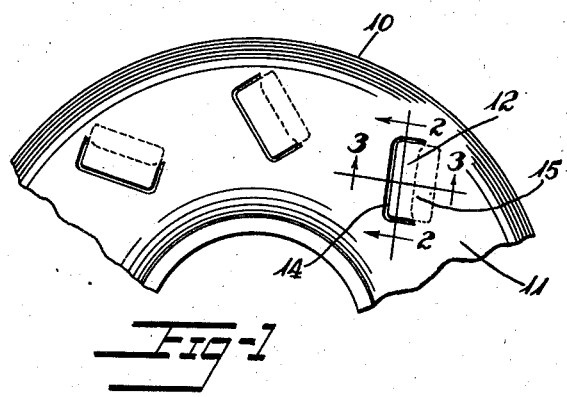
Figure 2:
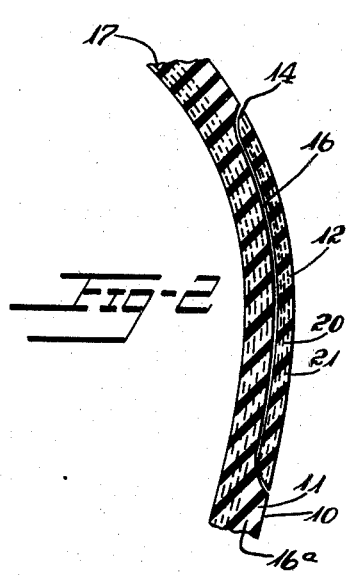
Figure 3:
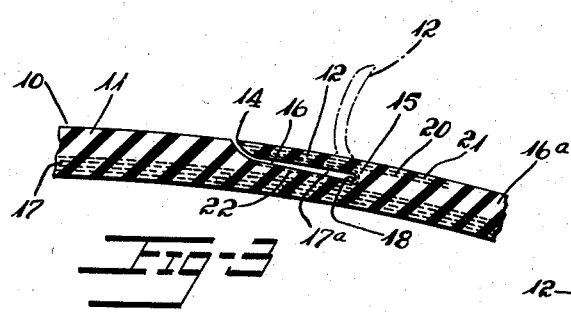
Figure 4:
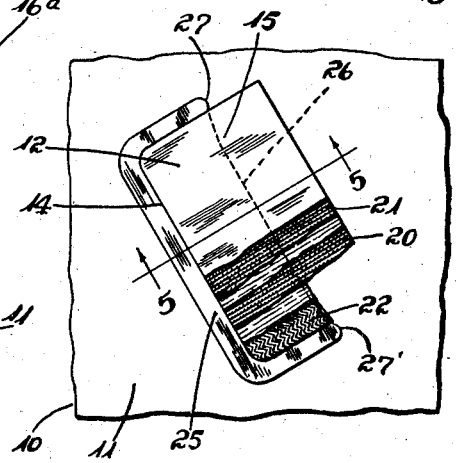
Figure 5:
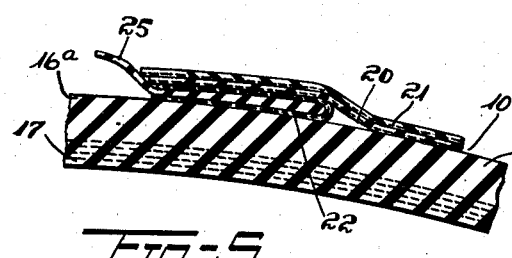
Figure 6:
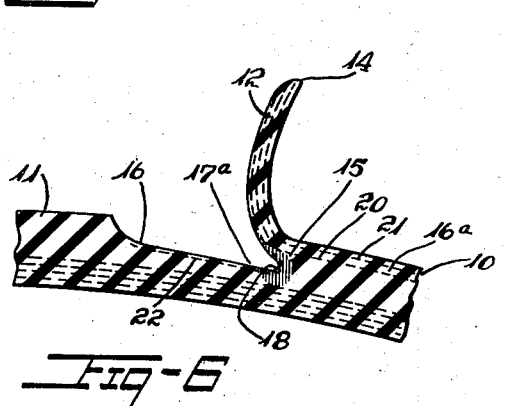

Of the drawings,

Fig. 1 is a side elevation of a vaned tire constructed in accordance with and embodying the invention, parts being broken away, Fig. 2 is a section thereof taken on line 2—2 of Fig. 1, Fig. 3 is a sectional view thereof taken on line 3—3 of Fig. 1, Fig. 4 is a view of one of the vanes with a separating member, the vane being broken away in steps to show its construction, Fig. 5 is a sectional view taken on line 5—5 of Fig. 4, and Fig. 6 is a diagrammatic cross sectional view of a vane showing the positions the vane assumes in use and the zone of hinging.

Referring to the illustrative embodiment shown in the drawings, the numeral 10 designates a tire having a side wall 11 along which are arranged a series of flaps 12 each having a free margin 14 and an opposite hinge portion 15. The free margins of the flaps extend all in one direction with relation to the direction of rotation of the tire, and the hinge portions 15 are preferably arranged so that each is diagonal to a radius of the tire, preferably with its free leading corner at a greater distance from the center of the tire than the free trailing corner thereof.

Each flap in its unstressed or normal position lies in a pocket 16 formed in the outer portion of the side wall of the tire and may be deflected outwardly thereof as indicated by the dot and dash line position of Fig. 3 by the force of the airstream or centrifugal force of the vane itself. In the deflected position, the vane extends into the air stream and acts, by reason of its resistance to movement of the tire into the airstream, to cause rotation of the tire about its axis.

The side wall of the tire has an outer layer 16$^a$ of soft vulcanized rubber or other rubber-like material overlying layers 17 of cords or fabric and the pocket 16 is formed in the layer 16$^a$ of rubber-like material. Preferably, the pocket is formed to provide a clearance space 17$^a$ between the flap and the underlying rubber-like material to assist the air in lifting the flap, and that portion of the pocket at the hinge of the flap is rounded, as at 18, to eliminate any sharp directional change of the surface which would induce tearing, by providing a rounded fillet at the hinge line.

For reinforcing the material of the flaps, one or more layers 20, 21 of rubberized cord material are embedded in the rubber-like material of the flap, and extend across the hinge line thereof into the layer 16$^a$ of rubber-like material. The cords are of weftless cord or of weak-wefted cord fabric, with the cords parallel to each other in each layer and preferably arranged perpendicular to the hinge line.

For preventing the tearing of the rubber-like material at the hinge portion 15, where the material is subjected to tension when the vane is raised by the force of the air stream or by centrifugal force as indicated by the shaded area in Fig. 6, while at the same time accomplishing this without objectionable interference with stretching of the rubber-like material at the inner face or portion 15 subjected to tension due to hinging, a layer 22 of stretchable fabric, such as stockinet, preferably made of nylon, is embedded in the rubber-like material along the floor of the pocket and extending about the hinge line substantially parallel to the surface of the rubber-like material in the hinge portion 15 and along the inner face of the flap with its direction of greatest stretch substantially at right angles to the hinge line. The stockinet fabric being of knitted material, is stretchable in the direction perpendicular to the hinge line and therefore permits stretching of the rubber-like material at the hinge line while effectively preventing the starting of cracks or tears in the rubber-like material. Preferably the inner face of the vane and the surface of the pocket in continuation thereof at the hinge region are molded to a smooth finish to minimize the likelihood of cracks which might start failures.

In manufacturing the tire, the usual cord layers 17 and rubber-like material 16$^a$ are assembled on a building core. The layer 22 of rubberized stockinet is folded about the rounded margin of a flexible form 25 and the layers 20, 21 of rubberized cord fabric are assembled over the form 25 and along the side wall of the tire in contact with the rubber-like material 16ª. The form or separator 25, which has a rounded edge at the hinge contacting margin, is made of fabric and hard rubber composition and is vulcanized before use as a separator. Other thermo-setting materials such as thermo-setting resins may be employed in making it, the materials being such as not to adhere to the unvulcanized rubber of the tire. The form or separator is tapered in thickness and is thicker at the hinge line where it presents a rounded molding surface. This rounded molding surface is preferably made somewhat concave in the direction of length of the margin as shown in Fig. 4 where the rounded edge has a central rectilinear portion 26 and is concave approaching outwardly turned corners 27, 27' as this form of separator provides a flap in which the greatest hinging stress is applied at the center portion of the hinging zone, where the hinge line is parallel to the free margin of the vane, and is least at the ends of the hinging zone where the hinging zone line recedes from the free margin of the vane, thereby avoiding the start of cracks at the ends of the hinging zone.

Resistance to the action of oil and grease may be provided by applying a thin layer of oil and grease resisting rubber-like material over the faces of the separator, such material becoming vulcanized to the tire and the vane during vulcanization of the tire. Such a thin coating may be formed by depositing a layer of oil and grease resisting cement on the separator and permitting it to dry thereon providing a film of oil and grease resisting rubber-like material thereon.

The assembled tire and vane material may be placed in a tire mold and expanded against the mold by fluid pressure applied to the inside of the tire during vulcanization of the tire. The flap with the separator becomes embedded in the side wall of the tire and after vulcanization has taken place, the separator is removed.

Variations may be made without departing from the scope of the invention as it is defined by the following claims.

I claim:

1. A tire comprising an annular body having a side wall comprising rubber-like material, vanes comprising rubber-like material integral with said side wall at spaced-apart positions thereabout providing resilient hinged connections with said side wall, each vane having at least one layer of parallel cords extending across its hinge line and continuing into said vane and said side wall adjacent thereto, and a layer of extensible fabric extending about the hinge line and therefrom along the inner face of the vane and the surface of the side wall beneath the vane, said fabric being stretchable in a direction normal to the hinge line.

2. A tire comprising an annular body having a side wall comprising rubber-like material, vanes comprising rubber-like material integral with said side wall at spaced-apart positions thereabout providing resilient hinged connections with said side wall, each vane having at least one layer of parallel cords extending across its hinge line and continuing into said vane and said side wall adjacent thereto, and a layer of extensible stockinet fabric extending about the hinge line and therefrom along the inner face of the vane and the surface of the side wall beneath the vane, said fabric being stretchable in a direction normal to the hinge line.

3. A tire comprising an annular body having a side wall comprising rubber-like material, vanes comprising rubber-like material integral with said side wall at spaced apart positions thereabout providing resilient hinged connections with said side wall, each vane having at least one layer of parallel cords extending across its hinge line and continuing into said vane and said side wall adjacent thereto, and a layer of extensible fabric extending about the hinge line and therefrom along the inner face of the vane and the surface of the side wall beneath the vane, said fabric being stretchable in a direction normal to the hinge line, said vane having its under surface spaced from the underlying side wall and meeting the side wall in a rounded fillet.

4. A tire comprising an annular body having a side wall comprising rubber-like material, vanes comprising rubber-like material integral with said side wall at spaced apart positions thereabout providing resilient hinged connections with said side wall, each vane having at least one layer of parallel cords extending across its hinge line and continuing into said vane and said side wall adjacent thereto, and a layer of extensible fabric extending about the hinge line and therefrom along the inner face of the vane and the surface of the side wall beneath the vane, said fabric being stretchable in a direction normal to the hinge line, the vane being joined to the tire along a line receding from the free margin of the vane at the ends of the vane.

5. A tire comprising an annular body having a side wall comprising rubber-like material, vanes comprising rubber-like material integral with said side wall at spaced-apart positions thereabout and meeting the material of said side wall in smooth continuation thereof, each vane having a hinged connection merging into said side wall and having at least one layer of parallel cords extending across its hinge line and continuing into said vane and said side wall adjacent thereto, and a layer of extensible fabric extending about the hinge line and therefrom along the inner surface of the vane and the surface of the side wall beneath the vane, said fabric being stretchable in a direction normal to the hinge line.

6. A tire comprising an annular body having a side wall comprising rubber-like material, vanes comprising rubber-like material integral with said side wall in smooth continuation thereof, each vane having a hinged connection merging into said side wall and having at least one layer of parallel cords extending across its hinge line and continuing into said vane and said side wall adjacent thereto, and a layer of extensible fabric extending about the hinge line and therefrom along the inner surface of the vane and the surface of the side wall beneath the vane, said fabric being stretchable in a direction normal to the hinge line, and a layer of oil-resisting rubber on the inner surface of the vane and along the surface of the side wall facing the vane.

7. A tire comprising an annular body having a side wall comprising rubber-like material, vanes comprising rubber-like material integral with said side wall at spaced-apart positions thereabout providing resilient hinged connections with said side wall, each vane having at least one layer of flexible reinforcing material extending across its hinge line and continuing into said vane and said side wall adjacent thereto, and a layer of extensible fabric extending about the hinge line and therefrom along the inner face of the vane and the surface of the sidewall beneath the vane, said fabric being stretchable in a direction normal to the hinge line.

JOHN O. ANTONSON.